Aug. 8, 1933.   A. S. BENJAMIN   1,921,799
REMOTE MOTOR CONTROL
Filed April 4, 1932
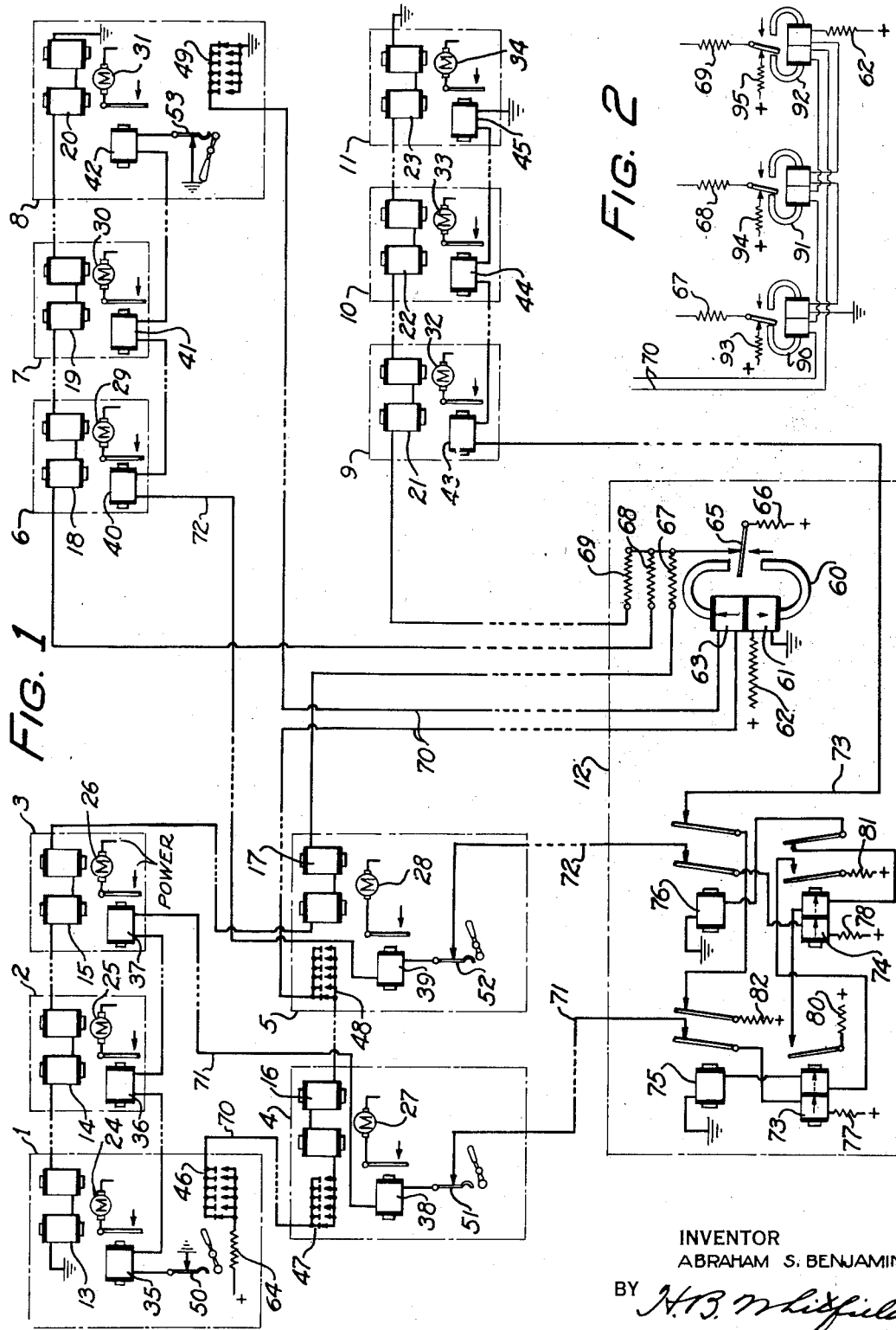
INVENTOR
ABRAHAM S. BENJAMIN
BY *H. B. Whitfield*
ATTORNEY Patented Aug. 8, 1933

1,921,799

UNITED STATES PATENT OFFICE 1,921,799

REMOTE MOTOR CONTROL

Abraham S. Benjamin, Chicago, Ill., assignor to Teletype Corporation, Chicago, Ill., a Corporation of Delaware Application April 4, 1932. Serial No. 603,061

8 Claims. (Cl. 178—4.1)

This invention pertains to telegraph systems using motor driven machines in which both the motors and the machines are controlled by signals transmitted over line circuits, and more particularly to systems in which the motor at any of a plurality of stations which are permanently connected is started by remote control in preparation to sending telegraphic control impulses.

The object of the invention is to provide a system for connecting the control circuits of driving motors in a manner such that all motors in a system may be started under the control of any predetermined starting location, and in which the wiring of all motors to a common control circuit may be accomplished in a simple manner despite any unusual geographical grouping of the locations of the stations.

A further object is the grouping of the transmitting and receiving machines of a system in such manner as to produce a balanced arrangement of the electrical devices in an irregularly grouped system to secure a maximum uniformity and reliability of operation.

The above and other objects of the invention are attained by grouping all of the signalling instruments upon lines arranged to be approximately equal in electrical characteristics radiating from a convenient repeating point or points, the motor control devices being also grouped upon similar lines, then uniting all of the communication signalling lines by a system of signalling repeaters, and uniting all of the motor control lines by another system of repeaters whereby the several radial lines pertaining to motor control are united into a signal system in which a motor control signal in any line is repeated into all other lines.

A clear understanding of the system may be had from the following description, taken in conjunction with the accompanying drawing, in which Fig. 1 shows the circuits for a system of eleven telegraph stations with one repeater, four of the telegraph stations being equipped for transmitting, and Fig. 2 shows an alternative arrangement of the repeater.

The system, as shown, comprises the stations 1 to 11 inclusive and the repeater 12. The receiving units 13 to 23 are located at each of the stations and the equipment of each station is arranged to be driven by an individual motor 24 to 34 inclusive. Each motor may be driven by an obvious source of power, direct or alternating, which is held open by the open contacts of normally energized control relays, 35 to 45 inclusive.

At each of stations 1, 4, 5 and 8 there is a transmitter 46 to 49 also driven by the motor, and a motor control key 50 to 53.

A polar repeating relay 60 at repeater 12 has a biasing winding 61 in series with resistance 62 in a local circuit; also an operating winding 63 in a transmitting circuit from positive battery through resistance 64, transmitters 46, 47, receiver 16, transmitter 48, line 70, winding 63, and transmitter 49 to earth. This circuit normally is closed, holding the relay 61 energized with its armature 65 against its upper contact. Any transmitter may operate the repeating relay 61 by opening and closing the transmitting circuit in code manner, and thus operate also the receiver 16.

The repeating relay 60 by its points, controls all receivers other than 16. The circuits for the repeated signals extend from positive battery through resistance 66, armature 65 and upper contact of relay 60, thence through resistances 67, 68, 69; through resistance 67 and receivers 17, 15, 14, 13 to earth, through resistance 68 and receivers 18, 19, 20, to earth, and through resistance 69 and receivers 21, 22, 23 to earth. The armature 65 controls every receiver except 16, and any transmitter may control receiver 16 directly and all other receivers through repeating relay 60.

The receiving circuits thus are arranged to be nearly equal in resistance and in inductance to secure uniform operation of all printers. The circuit containing resistance 64 has the inductance of receiver 16 and of relay winding 63. The circuit containing resistance 67 has the inductance of four receivers, while the circuits containing resistances 68 and 69 have each the inductance of three receivers. This distribution of inductance balances all of the circuits in electrical characteristics and makes all of them equally fast in response to the transmitters and gives the best arrangement for reliable operation.

The motor-control system is electrically separate from the line wire 70, and comprises three control wires 71, 72, 73, which are connected at the repeater station 12 to a control repeater of any desired type, and which are connected at the operating stations to all of the motor-control relays 35 to 45, and to all of the motor-control keys 50 to 53.

The motor-control repeater at station 12 comprises four relays 73, 74, 75, 76. Relay 73 is double-wound and normally is in energized condition by current from positive battery through resistance 77, left hand winding of relay 73, left hand armature and back contact of relay 75, wire 71, closed key 51, relays 38, 37, 36, 35 and closed key 50 to earth. Relay 74 is also double-wound and normally is in energized condition by current from positive battery, through resistance 78, left hand winding of relay 74, left hand armature and back contact of relay 76, wire 72, closed key 52, relays 39, 40, 41, 42 and closed key 53 to earth.

Relay 73 controls a first local circuit from positive battery through resistance 80, armature and back contact of relay 73, right hand winding and then right hand armature and front contact of relay 74 and winding of relay 76 to earth. Relay 74 controls a second local circuit from positive battery through resistance 81, left hand armature and back contact of relay 74, right hand winding of relay 73 and winding of relay 75 to earth. A control line circuit extends from positive battery through resistance 82, right hand armatures and back contacts of relays 75 and 76, line wire 73, and relays 43, 44, 45 to earth. The three line circuits traced over line wires 71, 72, 73 are normally closed when the system is not operating to send messages, and all relays 35 to 45 are normally in energized condition, as shown, with all motors 24 to 34 non-operating as a result of this energized condition of their controlling relays.

For operation, the opening of any starting key 50 to 53 will deenergize all motor-control relays and start all motors in the system.

The operator at station 1 or station 4 may open key 50 or 51 which will open line 71 and will deenergize relay 73 which by the first local circuit will hold relay 74 energized and will energize relay 76 to open lines 72 and 73. All motor-control relays 35 to 45 will be deenergized and all motors 24 to 34 will be operated. Transmitter 46 at station 1 or transmitter 47 at station 4 (or transmitter 48 or 49) may send a message to all receivers. At the conclusion of the message, the closing of key 50 or 51 will close the circuit of line 71 and will energize relays 35, 36, 37, 38 and 73. Relays 35 to 38 will stop motors 24 to 27. Relay 73 will open the first local circuit above described and will deenergize relays 76 and 74. Relay 76 will close lines 72 and 73, energizing relays 74 and 39 to 45, to stop motors 28 to 34.

The operator at station 5 or at station 8 may open key 52 or 53 which will open line 72 and will deenergize relay 74 which by the second local circuit will hold relay 73 energized and will energize relay 75 to open lines 71 and 73. All motor-control relays 35 to 45 will consequently be deenergized and all motors 24 to 34 will be operated. Any transmitter may send a message to all receivers. The reclosing of key 52 or 53 will close line 72 and will energize relays 39, 40, 41, 42 and 74. Relays 39 to 42 will stop motors 28 to 31 and relay 74 will open the second local circuit and will deenergize relays 75 and 73. Relay 75 will close the lines 71 and 73, energizing relays 35, 36, 37, 38, 43, 44, 45 and 73, to stop motors 24 to 27 and 32 to 34.

An alternative arrangement of repeater is shown in Fig. 2. The relay 60 of Fig. 1 is replaced by three relays, 90, 91, 92 of Fig. 2 whose line windings are in series in the circuit of line wire 70, and whose local windings may be in series also. The three relays are operated simultaneously by control from line 70, and the three armatures supply signal currents separately from the source of current through resistances 93, 94, 95 respectively to the resistances 67, 68, 69 and thence to the telegraphic line circuits as shown connected to those resistances in Fig. 1.

Although the invention has been described in connection with a specific form thereof, it will be understood that it has further applications and it is not intended to be limited by the embodiment shown for illustration.

The invention claimed is:

1. In a signaling system, receivers, transmitters, line circuits connecting said receivers and transmitters for transmission, motors for said receivers, relays, one for each motor and controlling the stopping and starting of said motors, a motor-control wire comprising two sections, said relays connected to said sections and a control repeater operating to open the other section when one section is opened.

2. In a signaling system, a plurality of receivers, a plurality of radial line sections, said receivers divided into groups and connected in said radial line sections with approximately equal electrical characteristics in each section, and repeating relays at a point common to said sections and connecting said sections together for telegraphic transmission.

3. In a signaling system, a plurality of receivers, a plurality of radial line sections, said receivers divided into groups and connected in said radial line sections with approximately equal electrical characteristics in each section, and a sole repeating relay at a point common to said sections and connecting said sections together for telegraphic transmission, said repeating relay having a sole operating winding in one of said line sections.

4. In a motor control system, telegraph stations, a telegraphic transmission line, a motor at each of said stations, a plurality of motor-control line sections interconnecting said stations, motor-control relays in said line sections, and a control repeater connecting together said motor-control line sections.

5. In a motor-control system, telegraph stations, transmission circuits interconnecting said stations, a motor at each of said stations, a plurality of control-line sections interconnecting said stations, a motor-control relay at each of said stations and connected in said line sections, a motor control repeater connecting said line sections, and a motor-control key at each of said stations and connected in said line sections.

6. In a motor-control system, telegraph stations, transmission circuits interconnecting said stations, a motor at each of said stations, a plurality of control-line sections interconnecting said stations, motor-control relays at said stations and in said line sections, a control repeater connecting two of said control-line sections to repeat a signal from either section into the other section, motor-control keys in the said connected line sections, and another control-line-section connected to said repeater and into which said repeater repeats a signal from either of said first mentioned two connected control-line-sections.

7. In a motor-control system, telegraph stations, a motor at each of said stations, a telegraphic communication circuit interconnecting said stations, a plurality of closed-circuit motor-control line sections radiating from a common point, motor-controlling relays in each of said line sections, relay-controlling keys in said line-sections and adapted to open the line section, and a signal repeater connecting said sections and operating to open all other sections when one section is opened by one of said keys.

8. In a motor-control system, telegraph stations, a motor at each of said stations, a telegraphic communication circuit interconnecting said stations, a plurality of closed-circuit motor-control line sections radiating from a common point, motor-controlling relays in each of said line sections, relay-controlling keys in said line-sections and adapted to open a line section, and relays connecting said sections and operating to open all other sections when one section is opened by one of said keys.

ABRAHAM S. BENJAMIN.